Nov. 15, 1960 T. F. UPTON 2,959,885

TELEPHONE BOOK STANDS

Filed April 15, 1959 2 Sheets-Sheet 1

INVENTOR.
Thomas F. Upton
BY
S. Stephen Baker
ATTORNEY

Nov. 15, 1960 T. F. UPTON 2,959,885

TELEPHONE BOOK STANDS

Filed April 15, 1959 2 Sheets-Sheet 2

INVENTOR.
Thomas F. Upton

BY

D. Nephew Baker
ATTORNEY

United States Patent Office 2,959,885

Patented Nov. 15, 1960

2,959,885

TELEPHONE BOOK STANDS

Thomas F. Upton, Forest Hills, N.Y., assignor to Herculox Loose Leaf Corporation, Clifton, N.J., a corporation of New York Filed Apr. 15, 1959, Ser. No. 806,604

3 Claims. (Cl. 45—60)

This invention relates to telephone book stands where one or more telephone books in binders are supported in a structure for convenient consultation and maintenance.

Structures for maintaining telephone books in binders where they can be swung up into a reading position or lowered into a normal or rest position have been known and are in wide usage. However, such telephone books are subjected to considerable abuse and sometimes a book may be worn out in a matter of a few days. I have found that it is desirable to confine a telephone book closely within a holder or frame so as to prevent the cover or the pages from spreading and thereby accumulating moisture or the like which damages a telephone book. I have, therefore, devised a structure which is adaptable to telephone book stands now in use and which causes the book to be closely or snugly embraced so as to minimize the rough usage above referred to and which better protects it from the elements.

With the foregoing in mind I have provided frame members which can be affixed to existing telephone book stands adjusted thereon in accordance with the size of the telephone book to be accommodated. The frame member is connectable to the existing structure by a simple yet effective device as will be shown hereinafter.

The invention will be further understood from the following description and drawings in which.

Figures 1, 2:
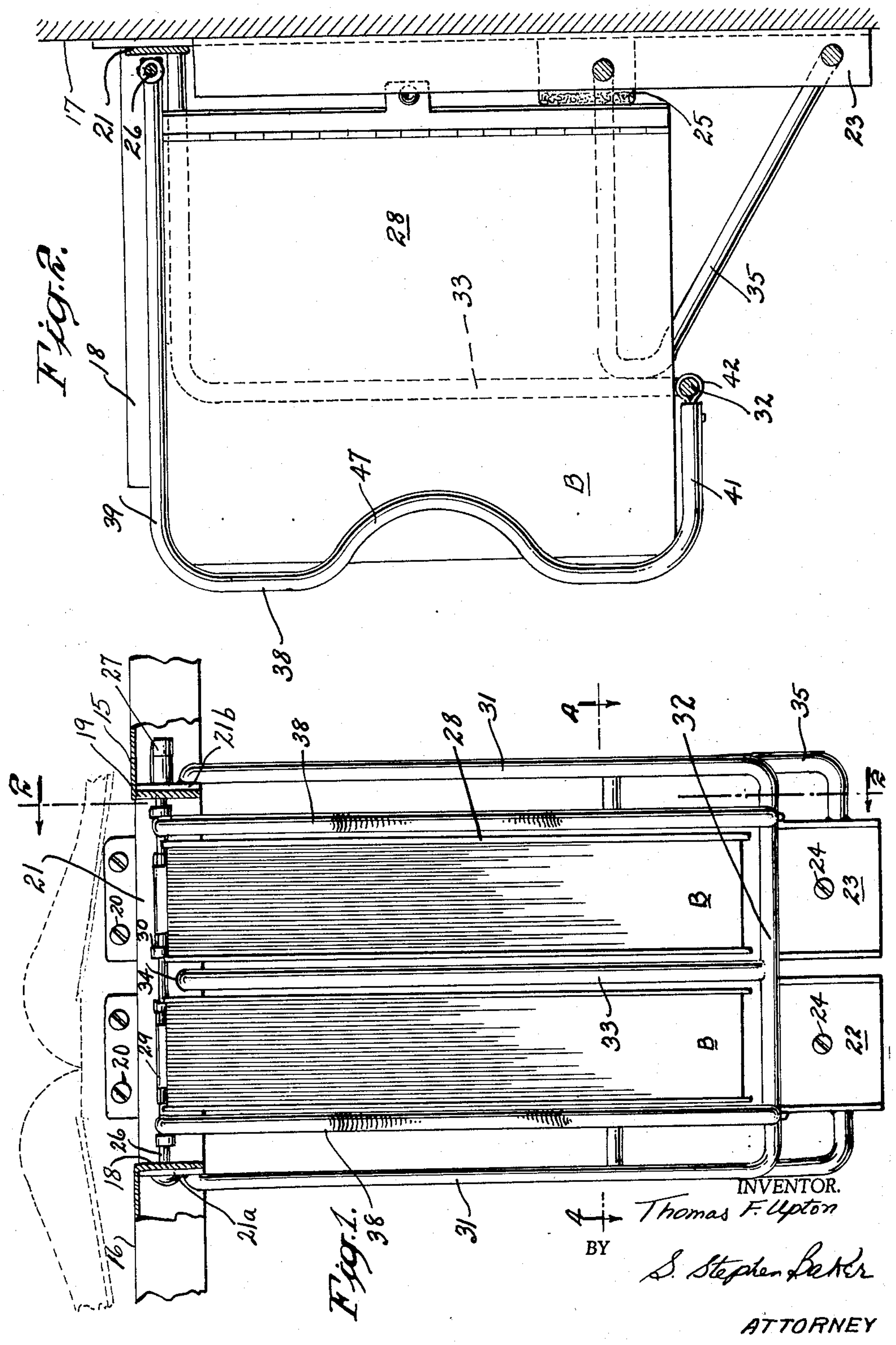
Figure 1 is a front elevational view of a telephone book stand structure according to the instant invention.
Figure 2 is a side elevational view as taken along the line 2—2 of Figure 1.
Figure 3:
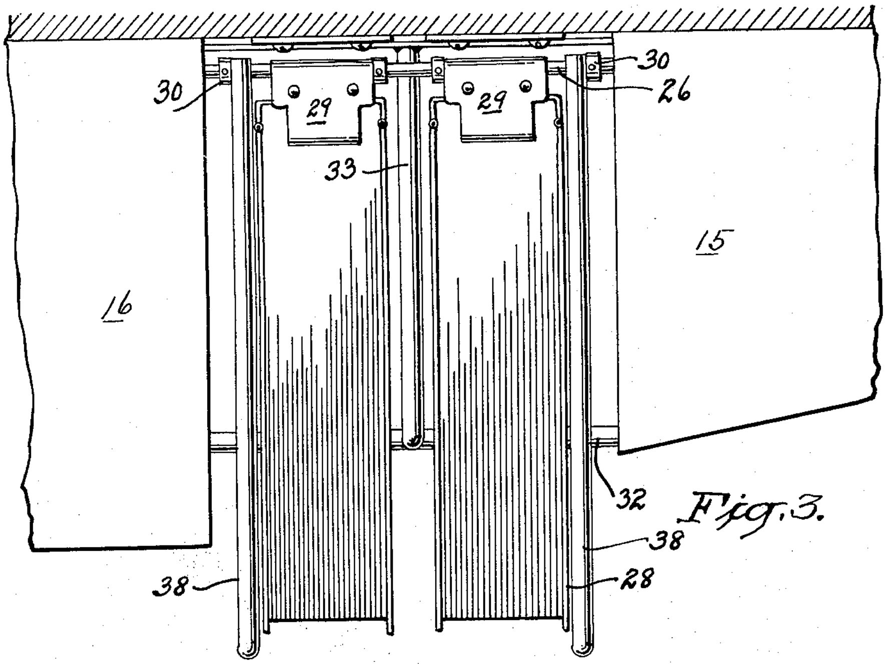
Figure 3 is a top plan view.

The conventional structure comprises a pair of opposed tables 15 and 16 which are used to support the outer book portions when the books are in an upward, open position for consultation. This position is shown in dotted lines in Figure 1. Such tables are horizontally spaced to define a book hanging or book supporting area, are secured in any conventional manner to a wall or other support 17, and are formed with depending side walls 18 and 19 respectively. Connected to the wall 17 is a large U-shaped bracket 21 which extends horizontally outwardly, its arms 21*a* and 21*b* extending parallel and immediately adjacent to the side walls 18 and 19 respectively and to which the bracket arms are connected.

Connected to the wall 17 as by screws 20 are fixed channel members 22 and 23 which extend vertically downwardly along the wall and parallel to each other. They are further secured to the wall at their bases by the screws 24. Such channel members, as will hereinafter be described, serve as backstops and normal rests for the telephone books in their binders. Adjacent to the bottom section of each channel member is a resilient pad 25 which may be of rubber or the like so as to absorb shocks when the telephone book is dropped into its normal rest position.

Connected to the arms of U-shaped bracket 21, parallel to and adjacent to the bridging portion thereof, is a rod 26 which is maintained in place as by removable lock 27. A specific form of lock 27 has been described and claimed in James P. Guinane United States Patent No. 2,815,971. The telephone books B in their binders are swingably supported on the rod 26. A specific form thereof is shown in James P. Guinane United States Patent No. 2,856,728 wherein is described the construction of binders 28 which incorporate top brackets 29. Such top brackets embrace the rod 26 so as to permit the rotation of the telephone books and binders in respect thereto. The books are maintained in position by adjustable collars 30 which may be slid along rod 26 and fixed in place by means of set screws.

Conventionally, a simplified form of frame is provided such frame comprising a substantially U-shaped vertical wire frame 31 which is connected as by welding to the outer ends of side walls 18 and 19. The arms of the U-shaped frame 31 depend downwardly from the tables 15 and 16.

From the center of frame 31, connected to horizontal cross rod 32 of the frame 31, is central wire or rod 33 which is in the form of a right angle and is connected at its upper end 34 to the rear center of the U-shaped bracket 21. Wire 33 is a fixed frame member which substantially embraces one side of the book and divides the structure into two compartments each adapted to swingably support a book in its binder as will hereinafter be described. Of course, more compartments may be provided if desired. For further strengthening means, wire brackets 35 are welded to the outer sides of the outer channel members 22 and 23.

Considering the compartments as being formed by the wire frame 31 together with its central wire 33, it will be observed that considerable and unnecessary space is provided for the telephone books B. Such extra space is highly undesirable for the following reasons:

The telephone books fly about in such space during usage; further, considerable moisture and other atmospheric elements reach the pages of the book and cause the book to expand and become distorted. Consequently, I have conceieved the idea of minimizing the space within which the telephone books are confined, in accordance with the thickness of the telephone book within its binder. In other words, a telephone book is best embraced by the wire frame in order to confine it within a more limited space and thereby eliminate the conditions above mentioned.

Figures 4, 5:
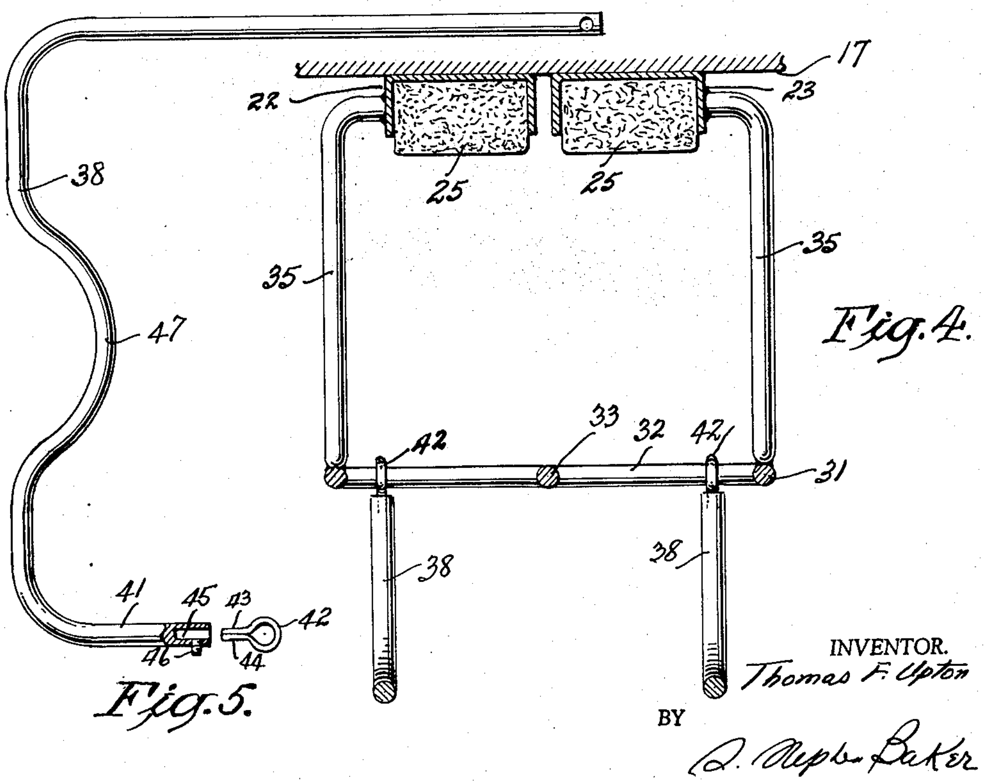
Figure 4 is a substantially diagrammatic view as taken along the line 4—4 of Figure 1 with the telephone books removed.
Figure 5 is an elevational, partly broken away exploded view, of a frame member as used in the present invention.

In accordance with the above I provide additional wire frames which are slidably adjusted on the rod 26 so as to cause the books to be snugly embraced. However, there was considerable difficulty in devising structure effective for this purpose without revising the entire base structure. In carrying out this invention, I provide frames 38 which are formed with upper horizontal arms 39 having an opening through which rod 26 extends. Adjustable collars 30 maintain arms 39 in position. The difficulty was to connect the lower horizontal arm 41 to the frame 31 while nevertheless maintaining it adjustable. Accordingly, I devised the following construction which is best illustrated in Figures 4 and 5. The lower end 41 of frame 38 is hollowed as illustrated in Figure 5. I applied a shortened cotter pin 42 to the frame 31 by spreading the legs of the cotter pin and providing an entrance so as to enable the cotter pin loop to embrace the central arm or horizontal cross rod 32 of frame 31 as illustrated in Figure 4. The cotter pin is thus horizontally adjustable on the cross rod 32 of frame 31. The legs 43 and 44 of the cotter pin 42, in their normal contiguous position, are received in the hollow 45 of lower arm 41 of frame 38. A set screw 46 locks the cotter pin 42 in place and also tightens the loop around the cross rod 32 of frame 31.

It can be seen from the foregoing that the wire frame 38 may be shifted horizontally as required in order to embrace or even compress the telephone book with its binder. This is done of course by first sliding the cotter pins 42 inwardly along the cross rod 32 and then tightening the frames 38 in position by locking the cotter pin as above described. In this manner, I have succeeded in applying the tightening frame 38 to conventional structure without having to reform the existing telephone book stand structure.

Wire frame 38 is provided, as is conventional, with an inward bowed portion 47 to facilitate grasping the telephone book in its binder.

As many frames 38 will be provided as can be accommodated by the cross rod 32 of frame 31, bearing in mind, of course, that each telephone book should be bounded by one of the adjustable frames 38. If a different telephone book, having a different width is inserted in the structure, the frames 38 can be adjusted accordingly.

There has been shown what is now considered a preferred embodiment of the invention but it is obvious that changes and omissions may be made without departing from its spirit.

What is claimed is:

1. A structure for swingably supporting books, said structure comprising a horizontal rod from which the books are swingably suspended, frame means on said structure and located so as to be adjacent to one side of a book for embracing said one side and a movable frame located so as to be adjacent to the other side of the book, said movable frame being adjustable inwardly so as to cause said book to be snugly received between said frame means and said movable frame when the book is in a normal, non-consulting position, the book being swingable away from said frame means and said movable frame when the book is swung to a consulting position, a horizontal cross rod on which said frame elements are disposed, said frame means being integrally connected to said cross rod, a slidable loop member on one end of said movable frame and embracing said cross rod for slidably horizontally adjusting said movable frame on said cross rod, said loop member having separable legs, said legs defining an entrance way into the loop, and locking means interconnecting said legs while locking said loop member to said movable frame.

2. A structure according to claim 1 and wherein said movable frame is formed with a hollow end, said legs being receivable within said hollow end, and said locking means including a set screw locking said legs within said hollow end.

3. A structure for swingably supporting books, said structure comprising a horizontal rod from which the books are swingably suspended, a fixed wire frame member on said structure and located so as to be adjacent to one side of a book, a horizontal cross rod on which said fixed frame member is connected, a movable frame member slidably connected to said cross rod so as to be disposable on the other side of said book for snugly confining said book within the space defined by said frame members, a looped member having separable legs connecting said movable frame member to said cross rod, said loop embracing said cross rod, said movable frame member being formed with a hollow on one end thereof and said legs being receivable in said hollow, and a locking member locking said legs in said hollow and locking the movable frame member in an adjusted position on said cross rod.

References Cited in the file of this patent

UNITED STATES PATENTS

| | | |
|---|---|---|
| 1,923,096 | Keely | Aug. 22, 1933 |
| 2,862,329 | Guinane et al. | Dec. 2, 1958 |